US012246923B2

(12) United States Patent
Weng et al.

(10) Patent No.: US 12,246,923 B2
(45) Date of Patent: Mar. 11, 2025

(54) VERTICAL TRANSMISSION EQUIPMENT

(71) Applicant: WISTRON CORP., New Taipei (TW)

(72) Inventors: Chi-Neng Weng, New Taipei (TW); Chen-An Sung, New Taipei (TW); Chuan-Sheng Li, New Taipei (TW)

(73) Assignee: WISTRON CORP., New Taipei (TW)

( * ) Notice: Subject to any disclaimer, the term of this patent is extended or adjusted under 35 U.S.C. 154(b) by 0 days.

(21) Appl. No.: 18/155,824

(22) Filed: Jan. 18, 2023

(65) Prior Publication Data

US 2024/0132289 A1 Apr. 25, 2024
US 2024/0228173 A9 Jul. 11, 2024

(30) Foreign Application Priority Data

Oct. 19, 2022 (TW) .................................. 111139564

(51) Int. Cl.
*B65G 17/12* (2006.01)
*B65G 17/34* (2006.01)
*B65G 23/24* (2006.01)
*B01L 3/00* (2006.01)

(52) U.S. Cl.
CPC .......... *B65G 17/123* (2013.01); *B65G 17/34* (2013.01); *B65G 23/24* (2013.01); *B01L 3/5085* (2013.01); *B65G 2812/02069* (2013.01)

(58) Field of Classification Search
None
See application file for complete search history.

(56) References Cited

U.S. PATENT DOCUMENTS

| 4,813,752 A | 3/1989 | Schindler |
| 5,738,225 A | 4/1998 | Kim |
| 6,394,260 B1* | 5/2002 | Barth .................. B65G 17/485 |
| | | 198/799 |
| 11,112,419 B2* | 9/2021 | van Mierlo .......... B65G 17/123 |
| 11,878,867 B2* | 1/2024 | Ishikawa ............. B65G 17/345 |
| 2008/0213080 A1 | 9/2008 | Cachelin et al. |
| 2011/0200419 A1 | 8/2011 | Yamasaki et al. |
| 2022/0348411 A1* | 11/2022 | Ishikawa ................ B65G 47/57 |
| 2024/0132289 A1 | 4/2024 | Weng |

FOREIGN PATENT DOCUMENTS

| CN | 205635636 U | 10/2016 |
| CN | 106185182 A | 12/2016 |
| CN | 109928146 A | 6/2019 |
| CN | 212268727 U | 1/2021 |
| CN | 112322452 A | 2/2021 |

(Continued)

OTHER PUBLICATIONS

DE-102013008872-B4, Machine Translation, retrieved Mar. 9, 2024 (Year: 2017).*

(Continued)

*Primary Examiner* — William R Harp
(74) *Attorney, Agent, or Firm* — McClure, Qualey & Rodack, LLP

(57) ABSTRACT

A vertical transmission equipment includes a base having a mount surface, a rail structure disposed on the mount surface, and a carrier movably disposed on the rail structure, the carrier includes a supporting surface, and the supporting surface of the carrier is perpendicular to the mount surface of the base.

16 Claims, 15 Drawing Sheets

(56) References Cited

FOREIGN PATENT DOCUMENTS

| | | | |
|---|---|---|---|
| CN | 212864734 U | 4/2021 | |
| CN | 113862255 A | 12/2021 | |
| CN | 215667912 U | 1/2022 | |
| CN | 216155833 U | 4/2022 | |
| DE | 10141074 A1 | 3/2003 | |
| DE | 102013008872 B4 * | 4/2017 | ............ B65B 35/38 |
| JP | S50108163 U | 9/1975 | |
| JP | 2021054641 A | 4/2021 | |
| TW | M394979 U1 | 8/2009 | |
| WO | 2007071988 A1 | 6/2007 | |
| WO | 2009145742 A2 | 12/2009 | |
| WO | 2018210088 A1 | 11/2018 | |

OTHER PUBLICATIONS

TW Office Action dated Jul. 11, 2023 in Taiwan application No. 1111339564.
EP Search Report dated Sep. 22, 2023 in EP aplication No. 23165098.7-1001.
TW Office Action dated Sep. 20, 2023 in Taiwan application No. 111139562.
JP Office Action dated Jun. 25, 2024 in Japanese application No. 2023-074041.
Non-Final Office Action issued in U.S. Appl. No. 18/152,818, filed Jan. 11, 2023, mailed Dec. 9, 2024.

* cited by examiner

VERTICAL TRANSMISSION EQUIPMENT

CROSS-REFERENCE TO RELATED APPLICATIONS

This non-provisional application claims priority under 35 U.S.C. § 119(a) on Patent Application No(s). 111139564 filed in Taiwan (R.O.C.) on Oct. 19, 2022, the entire contents of which are hereby incorporated by reference.

TECHNICAL FIELD

The disclosure relates to a transfer equipment, more particularly relates to a vertical transmission equipment.

BACKGROUND

On the conventional equipment for extraction, purification, and sample preparation, the well plate is supported and carried by a horizontally rotating platform. However, the horizontally rotating platform takes up horizontal space and therefore is unfavorable for increasing the number of equipment in a laboratory constrained by limited space.

SUMMARY

Accordingly, one aspect of the disclosure is to provide a vertical transmission equipment capable of solving the problem due to conventional equipment.

One embodiment of the disclosure provides a vertical transmission equipment including a base having a mount surface, a rail structure disposed on the mount surface, and a carrier movably disposed on the rail structure, the carrier comprises a supporting surface, and the supporting surface of the carrier is perpendicular to the mount surface of the base.

One embodiment of the disclosure provides a vertical transmission equipment including a base, a rail structure disposed on the base, and a carrier movably disposed on the rail structure, the carrier has a supporting surface, and the supporting surface of the carrier and the rail structure do not overlap with each other in a normal line of the supporting surface.

One embodiment of the disclosure provides a vertical transmission equipment including a base and a carrier comprising a supporting surface and movably disposed on the base along a transmission path, the supporting surface of the carrier is perpendicular to an imaginary plane which is defined by the transmission path of the carrier.

According to the vertical transmission equipments as discussed in the above embodiments of the disclosure, the supporting surface of the carrier is perpendicular to the mount surface of the base, the supporting surface does not overlap with the rail structure in the normal line of the supporting surface, or the supporting surface of the carrier is perpendicular to the imaginary plane which is defined by the transmission path of the carrier, thus the supporting surface of the carrier is kept in an angle perpendicular to the base and the rail structure. In other words, the vertical transmission equipment achieves a well plate carrier capable of movable in vertical manner, which makes the vertical transmission equipment take lesser horizontal space and therefore is favorable for increasing the number of equipments in a laboratory constrained by limited space.

BRIEF DESCRIPTION OF THE DRAWINGS

The present disclosure will become better understood from the detailed description given hereinbelow and the accompanying drawings which are given by way of illustration only and thus are not intending to limit the present disclosure and wherein.

DETAILED DESCRIPTION

Figure 1:
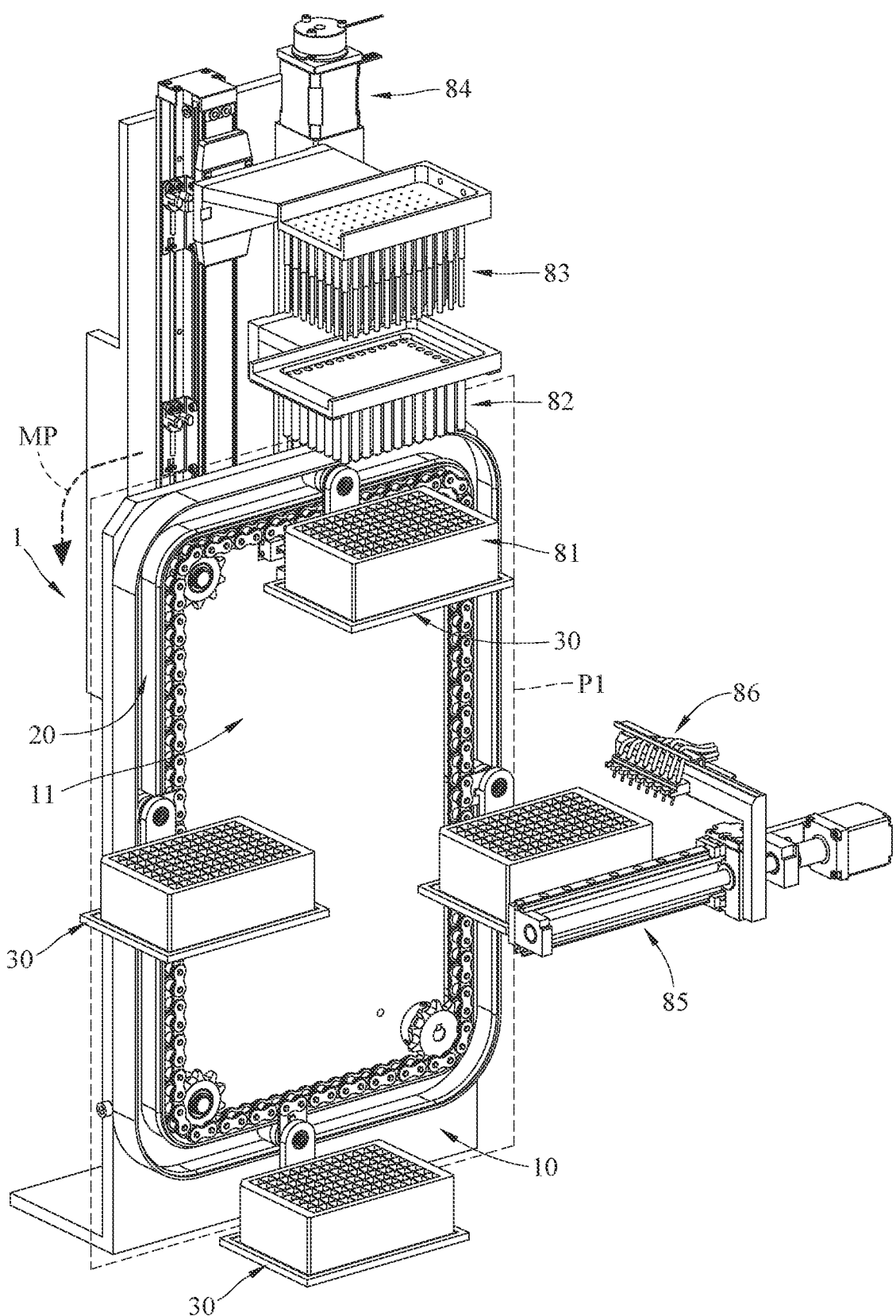
FIG. 1 is a perspective view of a vertical transmission equipment according to one embodiment of the disclosure.
Figure 2:
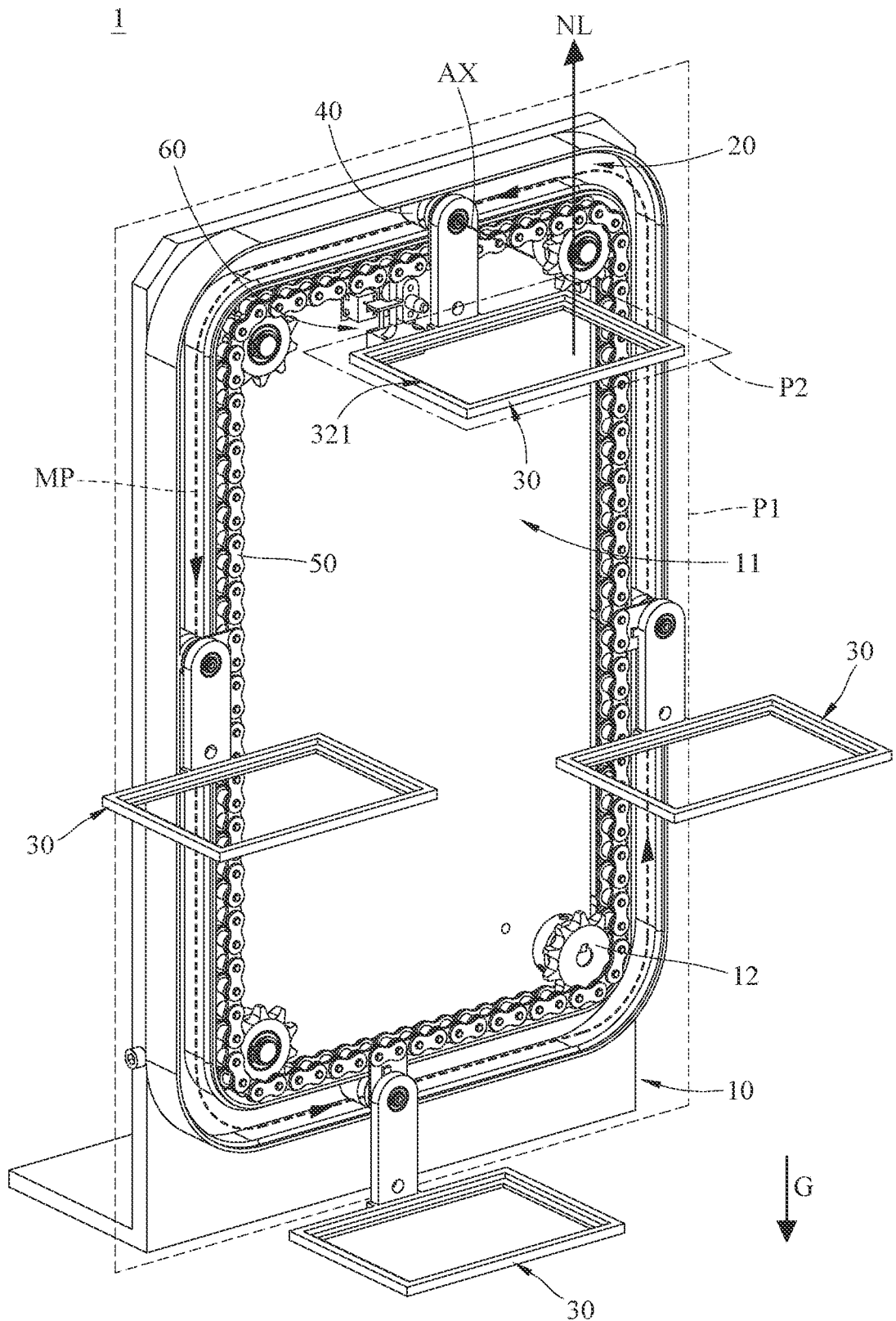
FIGS. 2-3 are partial perspective views of a vertical transmission equipment according to one embodiment of the disclosure taken from different view angles.
Figure 3:
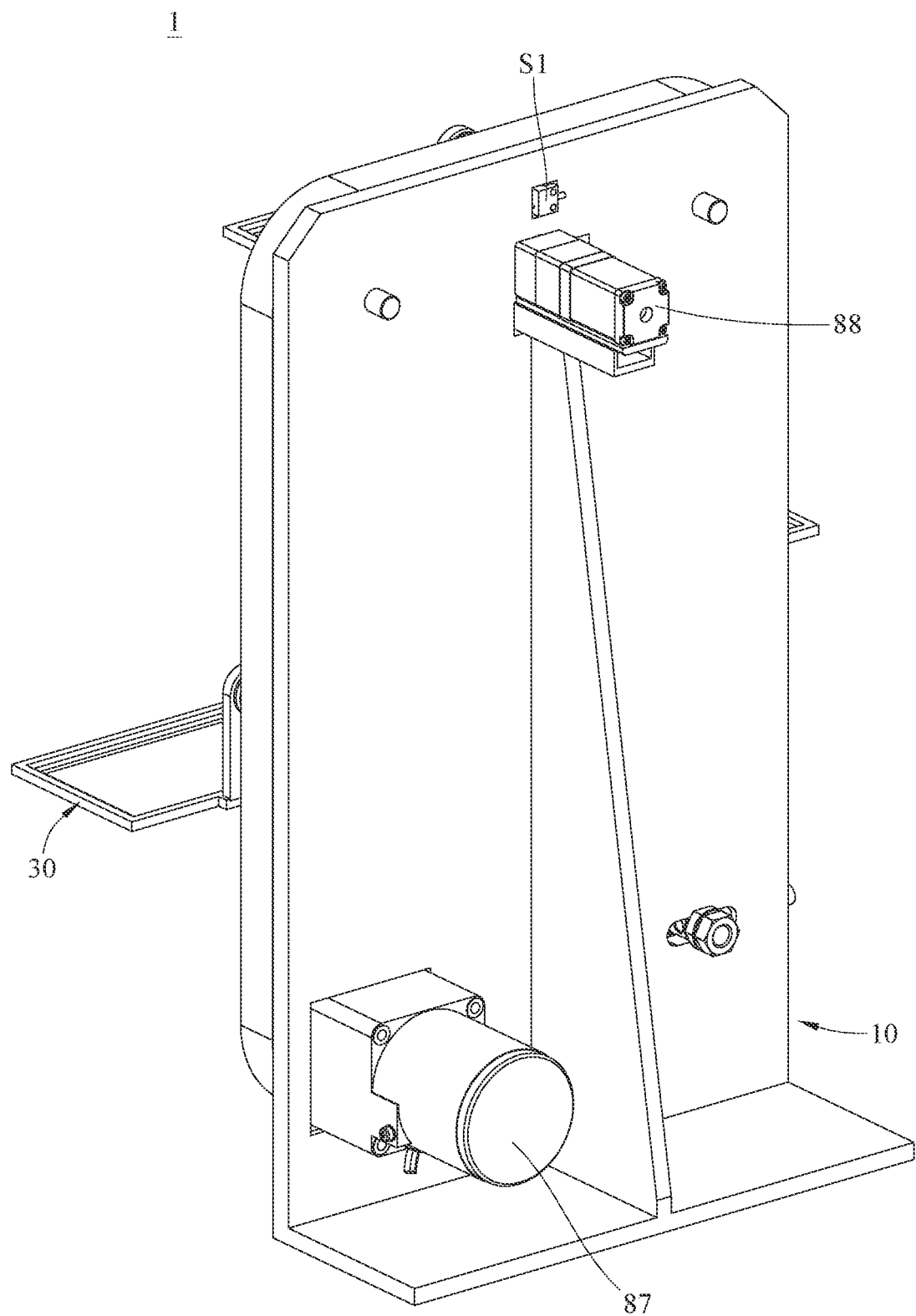

Firstly, referring to FIGS. 1-3, one embodiment of the disclosure provides a vertical transmission equipment 1, the vertical transmission equipment 1 may include a base 10, a rail structure 20 and a carrier 30. The rail structure 20 is disposed on the base 10. As shown, the base 10 may have a mount surface 11, the mount surface 11 means the surface of the base 10 in which the rail structure 20 is located. The carrier 30 is movably disposed on the rail structure 20 and therefore the carrier 30 is movable along a transmission path MP on the rail structure 20 relative to the base 10. In other words, the rail structure 20 defines the transmission path MP for the carrier 30 to move relatively to the base 10. In this embodiment, the rail structure 20 may be a closed loop rail in a required shape, thus, as shown, the transmission path MP of the carrier 30 may be a closed loop on an imaginary plane P1. Note that imaginary plane P1 is defined by the transmission path MP. As such, the carrier 30 is able to be repeatedly moved to different areas of the base 10 along the transmission path MP.

The carrier 30 may include a supporting surface 321, the supporting surface 321 may be a flat surface of the carrier 30 configured for supporting a well plate 81; in other words, the supporting surface 321 means a surface of the carrier 30 that is used to support the well plate 81. An imaginary plane P2 in which the supporting surface 321 is located is perpendicular to the imaginary plane P1 which is defined by the transmission path MP. Note that the imaginary plane P2 is defined by the supporting surface 321. In other words, the supporting surface 321 of the carrier 30 may be perpendicular to the mount surface 11 of the base 10 and the rail structure 20. Thus, in the normal line of the supporting surface 321 (i.e., a normal line NL of the imaginary plane P2), the supporting surface 321 of the carrier 30 does not overlap with the rail structure 20 and the mount surface 11 of the base 10, such that the supporting surface 321 of the carrier 30 is kept at an angle perpendicular to the base 10 and the rail structure 20 when moving. As such, the vertical transmission equipment 1 takes up lesser horizontal or lateral space and therefore is favorable for increasing the number of vertical transmission equipments in a limited space.

The well plate 81 may be any suitable multiwell plate with multiple sample wells used as small test tubes. For example, the well plate 81 may have 96, lesser, or more sample wells arranged in a matrix. The well plate 81 may be movable relative to the base 10 along the transmission path MP by being carried by the carrier 30. Note that the number of the carrier 30 that the base 10 can support may be modified as required and not intended to limit the disclosure. It is also noted that the well plate that the carrier 30 can support is merely provided for better understanding the disclosure but is not intended to limit the disclosure.

In this embodiment, the vertical transmission equipment 1 may further include a roller member 40. The roller member 40 is movably disposed on the rail structure 20 and therefore is only allowed to be movable along the transmission path MP relative to the base 10. The carrier 30 is pivotally connected to the roller member 40 about an axis AX. Thus, the carrier 30 is movable along the transmission path MP and is rotatable about the axis AX relative to the base 10 and the rail structure 20.

Since the carrier 30 is pivotally connected to the roller member 40, the gravitational force can naturally correct the carrier 30 to a position that makes the normal line NL of its supporting surface 321 parallel to the direction of gravity G; in other words, when the rail structure 20 is placed in vertical manner, the supporting surface 321 of the carrier 30 may be self-positioned to be horizontal manner by gravitational force, thereby automatically correcting the angle of the well plate 81 to be horizontal during the movement of the carrier 30 relative to the base 10.

Optionally, the vertical transmission equipment 1 may be cooperated with a sleeve set 82, a magnetic rod set 83, and a lifting mechanism 84. The lifting mechanism 84 may be disposed on the base 10. The sleeve set 82 and magnetic rod set 83 may be connected to different rails of the lifting mechanism 84 and therefore can be moved in vertical direction separately. When the carrier 30 moves the well plate 81 to be under the sleeve set 82 and the magnetic rod set 83, the lifting mechanism 84 may move the sleeve set 82 and magnetic rod set 83 into the wells of the well plate 81 in the required order, the lifting mechanism 84 then can cause the sleeve set 82 and magnetic rod set 83 to vibrate in a predetermined manner so as to perform the required process to the substance stored in the wells.

Optionally, the vertical transmission equipment 1 may be cooperated with a feeding mechanism 85 and a substance feeder 86. The feeding mechanism 85 may be disposed on the base 10 or disposed on an external structure so as to be located adjacent to the base 10. The substance feeder 86 is connected to and movable by the feeding mechanism 85. The substance feeder 86 may be moved horizontally by being driven by the feeding mechanism 85. As such, when the carrier 30 moves the well plate 81 along the transmission path MP to a side of the base 10 that corresponds to the feeding mechanism 85, the feeding mechanism 85 can move the substance feeder 86 to above the well plate 81 so that the substance feeder 86 can add required substance into the selected wells.

It is noted that the vertical transmission equipment 1 may use the carrier 30 to move the well plate 81 to another selected area of the base 10 for performing another process, but the disclosure is not limited thereto.

The vertical transmission equipment 1 may further include a power source 87, a plurality of transmission gears 12, and a transmission component 50. The transmission gears 12 are pivotally disposed on the mount surface 11 of the base 10 and are arranged adjacent to the rail structure 20. The power source 87 may be any suitable motor. The power source 87 may be disposed on the base 10 and connected to one of the transmission gears 12, thus the power source 87 is able to rotate the transmission gear 12 relative to the base 10. The transmission component 50 may be any suitable gear chain capable of meshing with the transmission gears 12. The transmission component 50 may be arranged along the rail structure 20 (or, along the transmission path MP) and is movably disposed on the base 10 via the transmission gears 12. As such, the transmission gear 12 that is connected to the power source 87 can simultaneously cause the other transmission gears 12 to rotate via the transmission component 50 when being driven by the power source 87.

Figure 4:
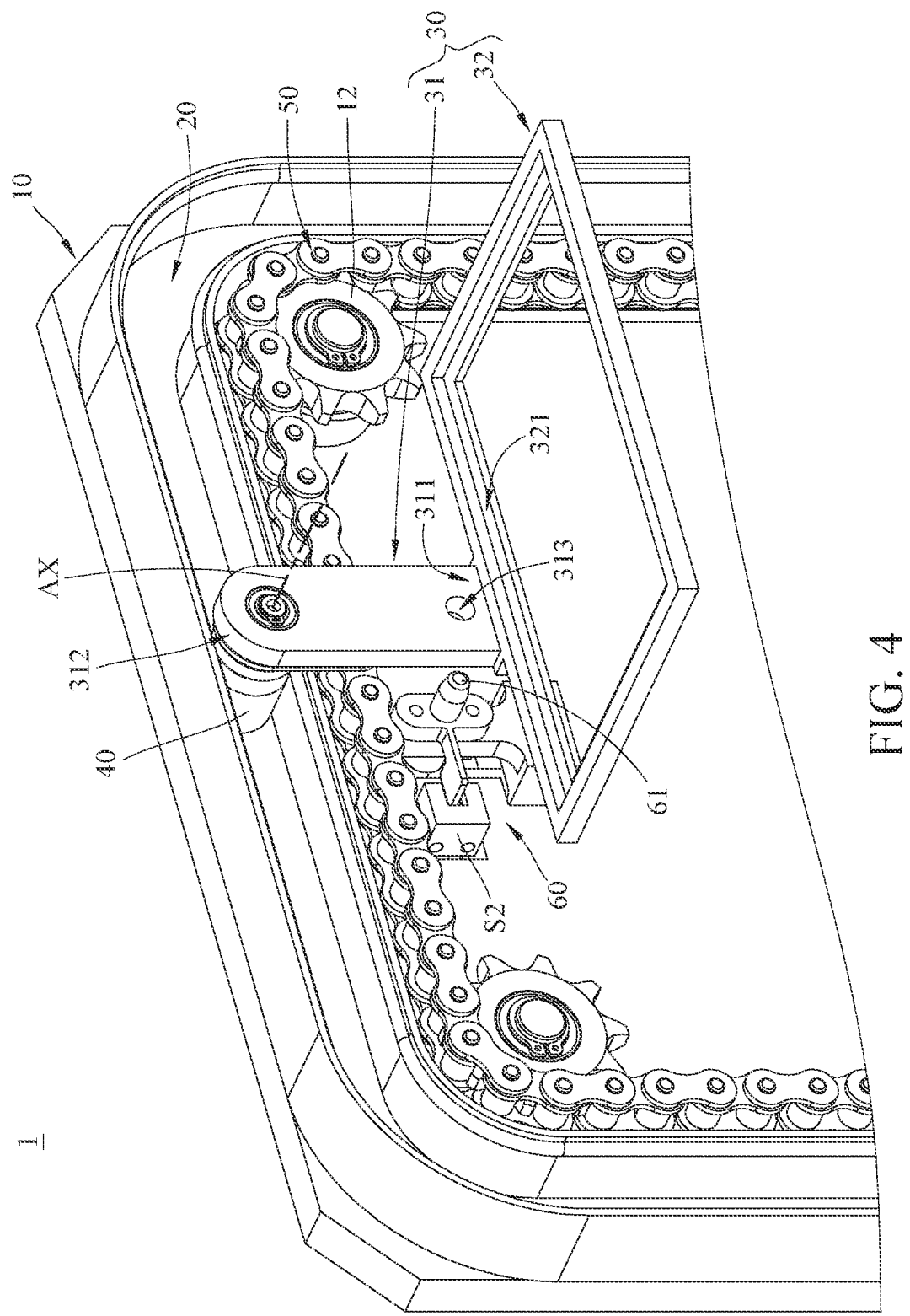
FIG. 4 is a partially-enlarged view of a vertical transmission equipment according to one embodiment of the disclosure.
Figure 5:
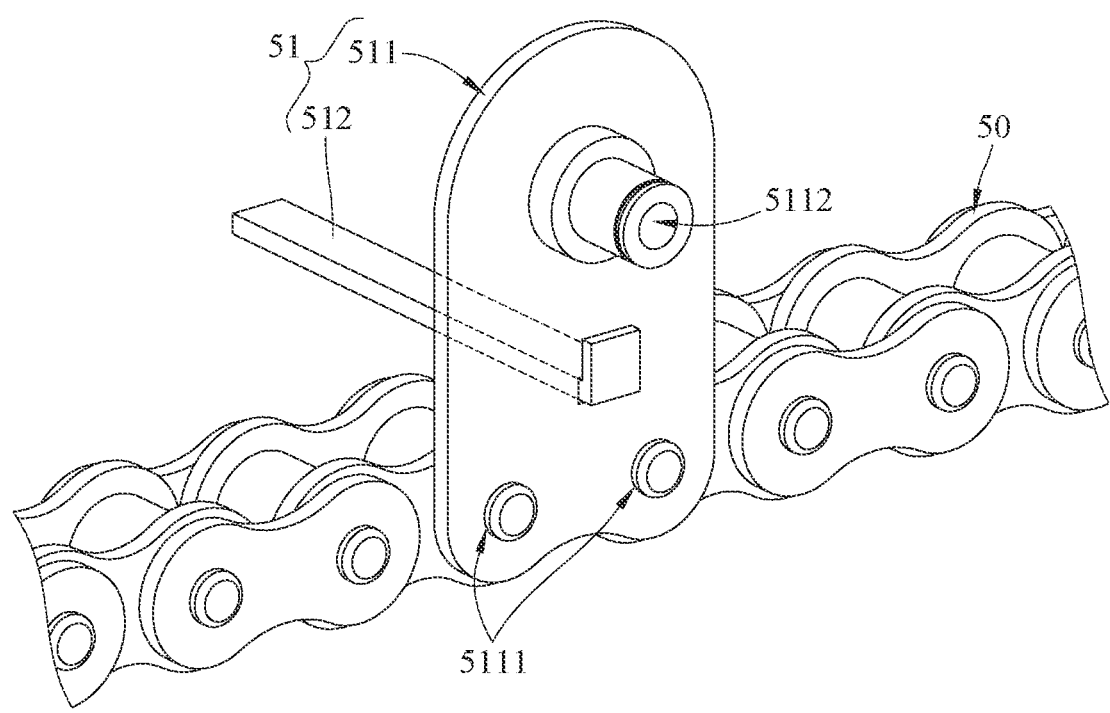
FIG. 5 is a partially enlarged view of the transmission component of a vertical transmission equipment according to one embodiment of the disclosure.
Figure 6:
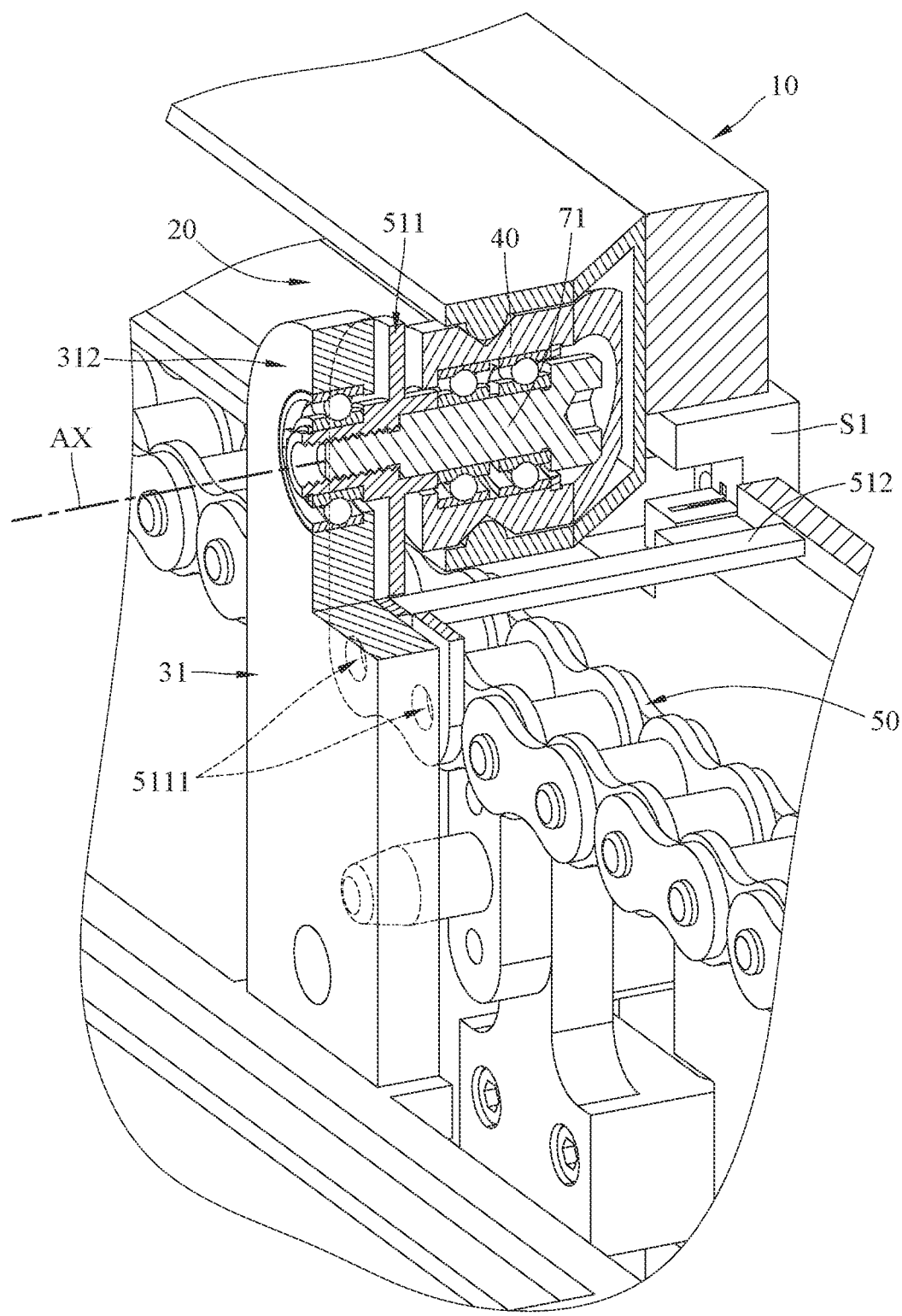
FIGS. 6-7 are partially-enlarged cross-sectional views of a vertical transmission equipment according to one embodiment of the disclosure taken from different view angles.
Figure 7:
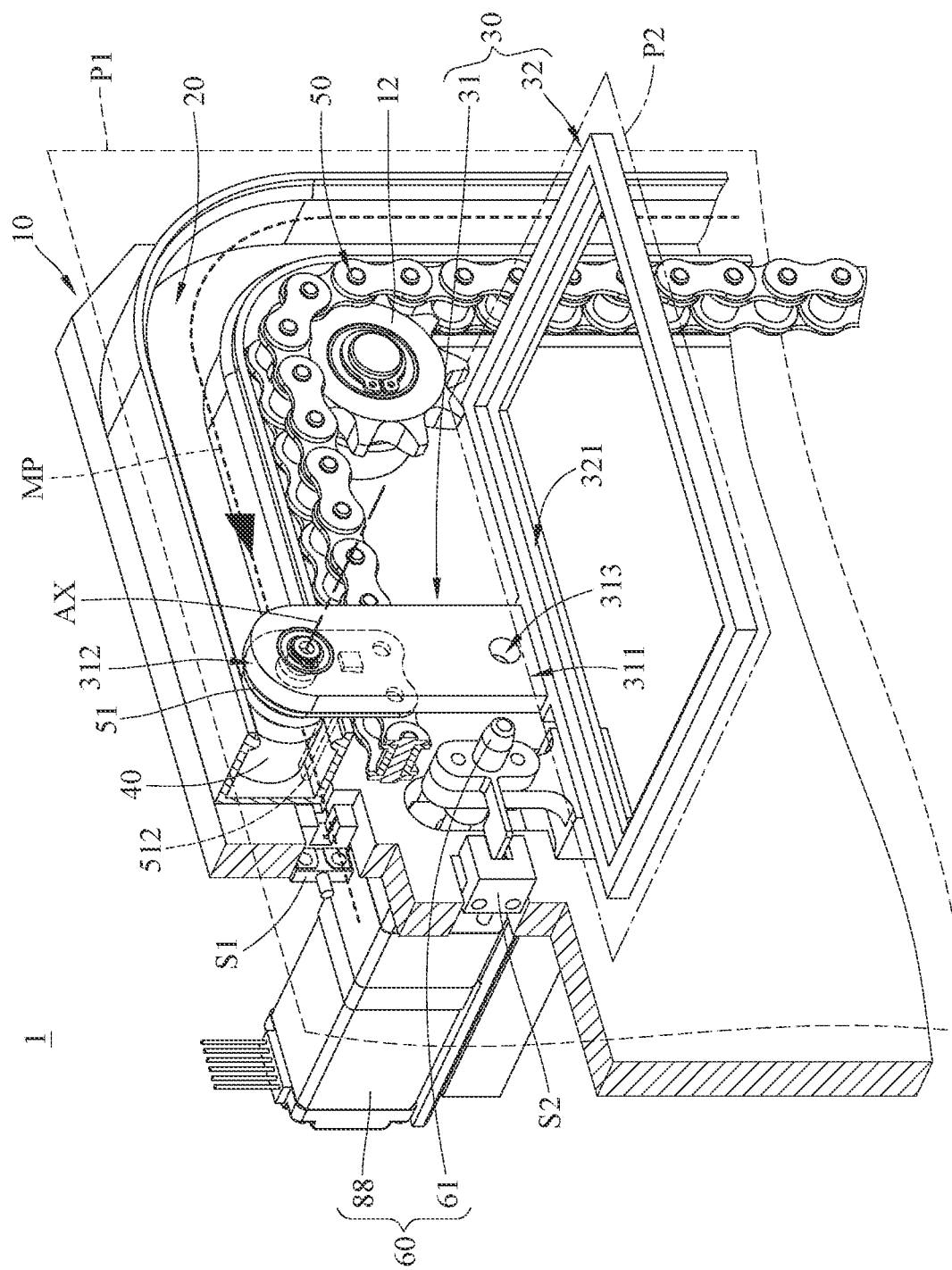

Please refer to the aforementioned figures and further refer to FIGS. 4-7, where FIG. 4 is a partially-enlarged view of the vertical transmission equipment 1, FIG. 5 is a partially enlarged view of the transmission component 50, and FIGS. 6-7 are partially-enlarged cross-sectional views of the vertical transmission equipment 1 taken from different view angles.

In this embodiment, the vertical transmission equipment 1 may further include a shaft 71. The shaft 71 is disposed through the roller member 40. The transmission component 50 may include an outer plate 51 and a conveyor member 52. The shaft 71 may be inserted into the outer plate 51 of the transmission component 50. As shown, the outer plate 51 may include a plate portion 511. The plate portion 511 may include a shaft hole 5112 and a mount portion 5111. The shaft 71 is disposed through the shaft hole 5112. The outer plate 51 is fixed to parts of the conveyor member 52 of the transmission component 50 (not numbered, such as inner plate and rollers) via its mount portion 5111. A projection of the rail structure 20 on the mount surface 11 of the base 10 does not overlap with a projection of the conveyor member 52 of the transmission component 50 on the mount surface 11 of the base 10. In addition, the rail structure 20 surrounds the conveyor member 52 within. Moreover, a projection of the transmission path MP of the carrier 30 on the imaginary plane P1 does not overlap with a projection of the conveyor member 52 on the imaginary plane P1.

The carrier 30 may include a bridging structure 31 and a supporting structure 32. The supporting structure 32 means the part of the carrier 30 used to support the well plate 81. The supporting structure 32 may include the supporting surface 321. The bridging structure 31 may be pivotally disposed on the shaft 71 and connects the supporting structure 32, thus, the supporting structure 32 is connected to the shaft 71 via the bridging structure 31 and the bridging structure 31 is pivotally connected to the roller member 40 via the shaft 71. The bridging structure 31 may include a connecting portion 311 and a distal portion 312 which are located opposite to each other. The connecting portion 311 means the portion of the bridging structure 31 in which the supporting structure 32 is connected to the bridging structure 31, and the distal portion 312 means the portion of the bridging structure 31 that is pivotally sleeved on the shaft 71.

At least part of the outer plate 51 of the transmission component 50 may be pivotally connected to and located between the bridging structure 31 of the carrier 30 and the roller member 40, thus, the carrier 30 and the roller member 40 are both rotatable relative to the outer plate 51. When the power source 87 causes the transmission component 50 to move by driving the transmission gear 12 connected thereto, the power source 87 is able to move the shaft 71 which penetrates through the carrier 30 and the roller member 40 via the outer plate 51 of the transmission component 50 thereby causing the shaft 71, the carrier 30 and the roller member 40 to move along the transmission path MP.

It is noted that the vertical transmission equipment 1 may selectively position the carrier 30 in the selected area of the base 10 that is favorable for keeping the carrier 30 in horizontal position. For example, the vertical transmission equipment 1 may selectively move the carrier 30 to a specific position that the supporting surface 321 of the carrier 30 and the well plate 81 on the carrier 30 can kept in horizontal due to gravitational force.

Specifically, the vertical transmission equipment 1 may further include a positioning assembly 60 and a first sensor S1, and the transmission component 50 may further include a protrusion structure 512 protruding from the plate portion 511. The positioning assembly 60 may be disposed on the base 10. The positioning assembly 60 may include a power source 88 and a positioning structure 61. The power source 88 may be any suitable motor. The power source 88 may be disposed on the base 10. The positioning structure 61 may be connected to the power source 88 and is movably disposed on the base 10 via the power source 88. Specifically, the power source 88 is able to move the positioning structure 61 back and forth along a direction parallel to the axis AX. Corresponding to the positioning structure 61, the bridging structure 31 of the carrier 30 may further include a positioning hole 313. The positioning hole 313 may be located between the connecting portion 311 and the distal portion 312 of the bridging structure 31. The first sensor S1 may be disposed on the base 10. For example, the first sensor S1 may be disposed on or adjacent to the path that the protrusion structure 512 travels. When the first sensor S1 senses the protrusion structure 512, the carrier 30 is determined to be in the predetermined position. At that moment, the power source 88 is able to move the positioning structure 61 of the positioning assembly 60 into the positioning hole 313 of the carrier 30 so as to prevent the carrier 30 from rotating relative to the base 10.

Optionally, the positioning assembly 60 may further include a second sensor S2. The second sensor S2 may be disposed on the base 10. For example, the second sensor S2 may be disposed on or adjacent to the path that the positioning structure 61 of the positioning assembly 60 travels. When the second sensor S2 senses the positioning structure 61, it is determined that the power source 88 already causes the positioning structure 61 to move out of the positioning hole 313 of the carrier 30 and thereby preventing the positioning structure 61 from interfering the later movement of the carrier 30.

Figure 8:
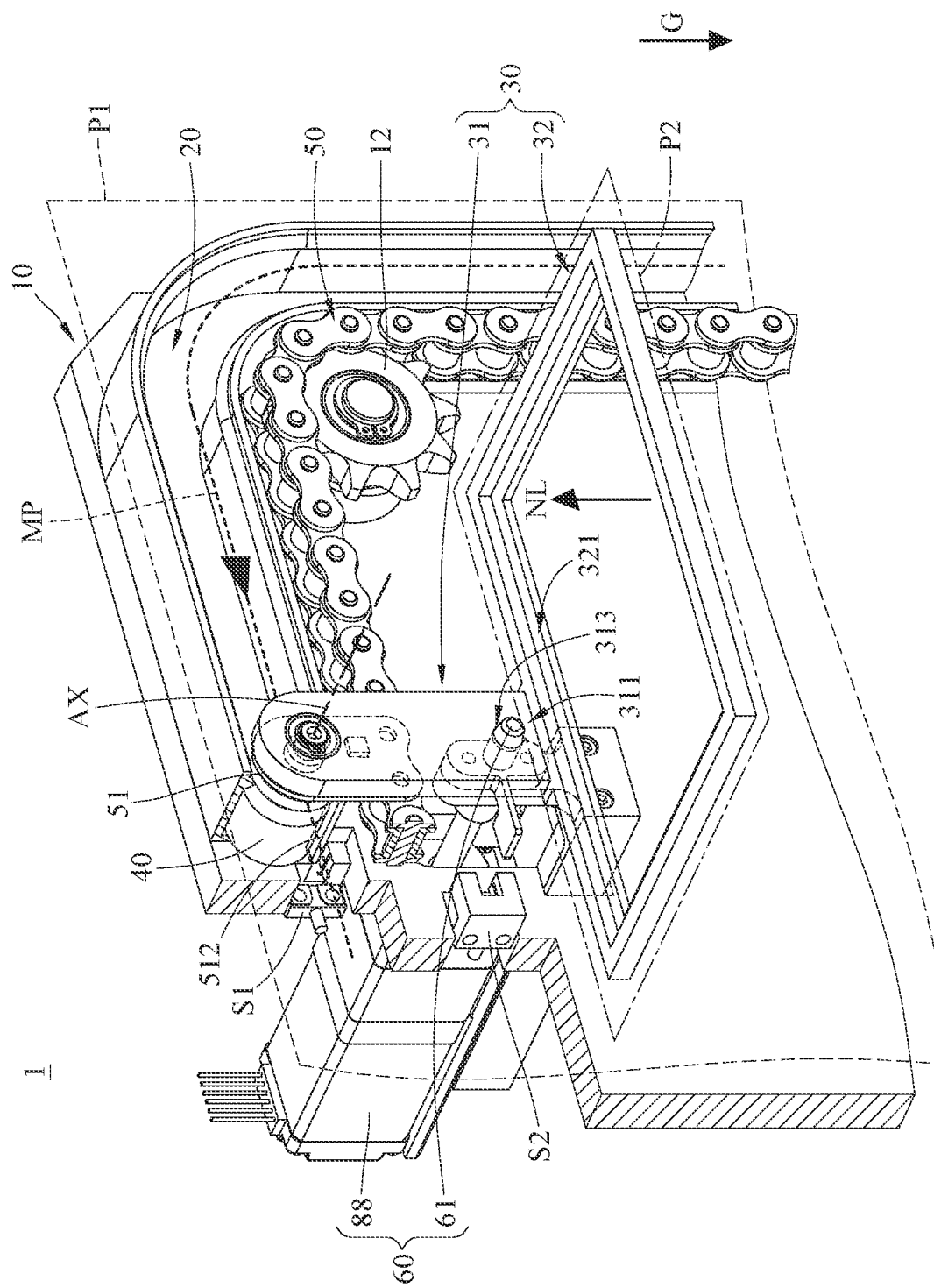
FIG. 8 is a partially-enlarged cross-sectional view of a vertical transmission equipment according to one embodiment of the disclosure when the carrier is positioned by the positioning assembly.

Then, please refer to FIG. 7 and further refer to FIG. 8, where FIG. 8 depicts that the carrier 30 is positioned by the positioning assembly 60. In FIG. 7, the transmission component 50 can move the carrier 30 and the roller member 40 along the transmission path MP to the position in FIG. 8 by its outer plate 51 and shaft 71. Then, in FIG. 8, when the first sensor S1 senses the protrusion structure 512 of the outer plate 51 (in other words, when the protrusion structure 512 moves to the area can be sensed by the first sensor S1), meaning that the carrier 30 reaches the predetermined position. Then or meanwhile, the power source 87 stops driving the transmission component 50, and the power source 88 moves the positioning structure 61 of the positioning assembly 60 into the positioning hole 313 on the bridging structure 31 of the carrier 30. That is, when the positioning structure 61 is inserted into the positioning hole 313, the carrier 30 is positioned. As such, the positioning assembly 60 can secure the part of the carrier 30 which is located away from the axis AX using the positioning structure 61 so as to secure the angle and position of the carrier 30. At that moment, the normal line NL of the imaginary plane P2 in which the supporting surface 321 of the carrier 30 is located is parallel to the direction of gravity G. As a result, the positioning assembly 60 secures the supporting surface 321 of the carrier 30 in horizontal status.

Then, when the carrier 30 is needed to be moved to the next stop along the transmission path MP, the power source 88 withdraws the positioning structure 61 of the positioning assembly 60 from the positioning hole 313 of the carrier 30. When the second sensor S2 senses the positioning structure 61, it is determined that the positioning structure 61 is moved to a position that does not interfere the movement of the carrier 30. By doing so, the power source 87 then can drive the transmission component 50 again to move the carrier 30 and the roller member 40 along the transmission path MP.

It is noted that the previous vertical transmission equipment is one of exemplary embodiments of the disclosure but is not intended to limit the disclosure. It is also noted that the vertical transmission equipment can be modified as required. The following provides vertical transmission equipments of other embodiments which are capable of achieving the effect the same as shown in, for example, FIG. 8, but for the purpose of simplicity, only the main differences between the introduced embodiment and the previous embodiments will be described in detail, and the same or similar parts can be comprehended with reference to the corresponding paragraphs and thus will not be repeatedly described hereinafter. It is also noted that the same reference number denote the same component or element.

Figure 9:
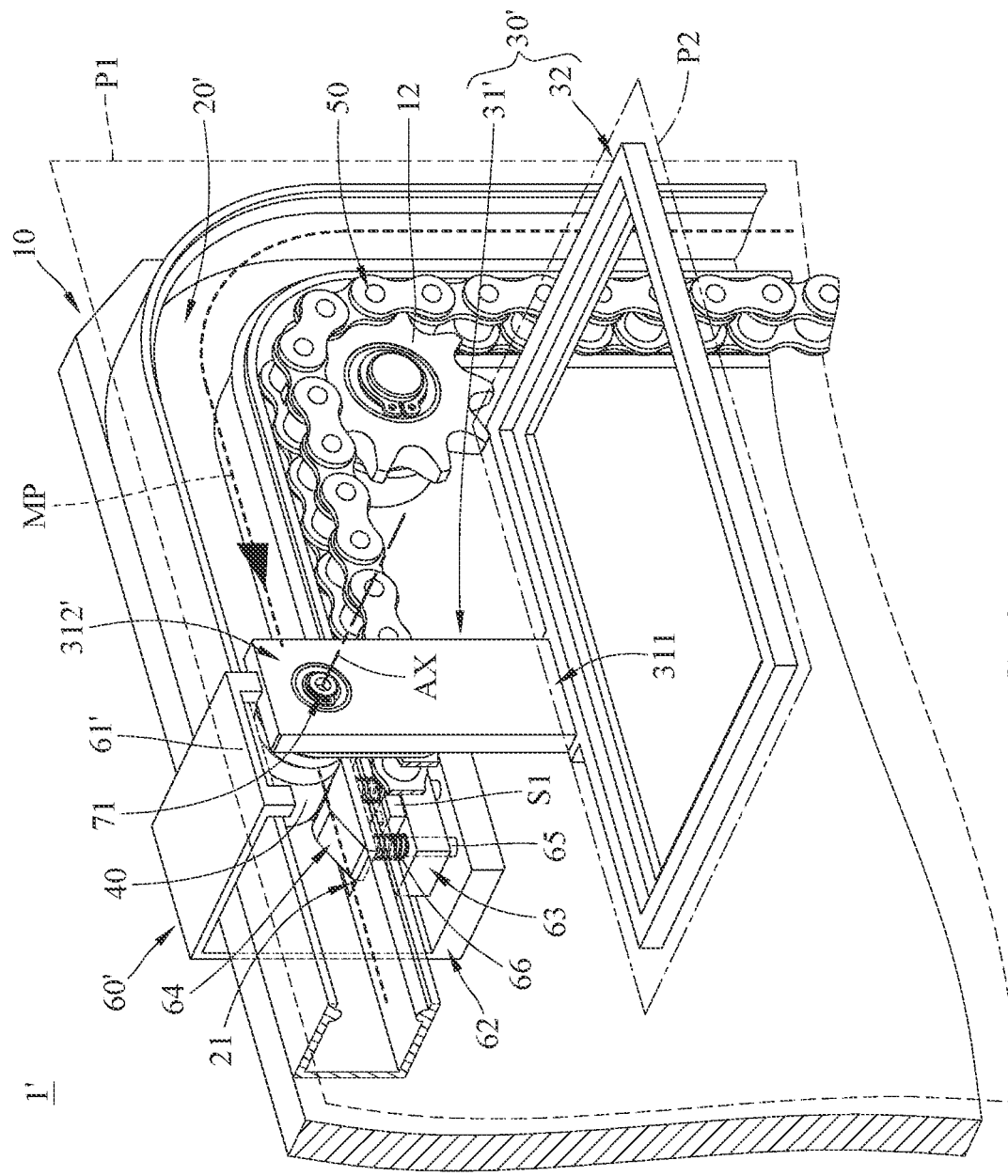
FIG. 9 is a partially-enlarged view of a vertical transmission equipment according to one embodiment of the disclosure.

For example, please refer to FIG. 9, another embodiment of the disclosure provides a vertical transmission equipment 1' whose positioning assembly 60' is the main difference from the previous embodiment. Specifically, the positioning assembly 60' may include a positioning structure 61', a spanning portion 62, a fixed portion 63, a pushable component 64, at least one guiding rod 65, and at least one elastic component 66. Correspondingly, the rail structure 20' may include a through hole 21.

The fixed portion 63 may be fixed to the base 10. The guiding rod 65 is disposed through the fixed portion 63. The pushable component 64 and one end of the spanning portion 62 are respectively connected to two opposite ends of the guiding rod 65. The pushable component 64 may be movably located at a through hole 21 of the rail structure 20'. The first sensor S1 may be disposed on the fixed portion 63. Specifically, the first sensor S1 may be located at a side (or, surface) of the fixed portion 63 which faces toward the pushable component 64. The elastic component 66 may be any suitable compression spring. The elastic component 66 may be sleeved on the guiding rod 65 and sandwiched between the pushable component 64 and the fixed portion 63 (or, two opposite ends of the elastic component 66 are respectively in contact with the pushable component 64 and the fixed portion 63), such that the elastic component 66 is able to force the pushable component 64 to move away from the fixed portion 63 and thereby causing at least part of the pushable component 64 to penetrate through the through hole 21 and into the rail structure 20'. Please refer to FIG. 10, specifically, the pushable component 64 may include an inclined abutting surface 641 and a releasing inclined surface 642 which are respectively located at two opposite sides thereof and are both inclined relative to the transmission path MP. Due to the elastic component 66, the inclined abutting surface 641 and the releasing inclined surface 642 may be kept in the rail structure 20 and therefore are kept in the path that the roller member 40 travels. The inclined abutting surface 641 means the slope or slanted surface of the pushable component 64 that is configured for receiving the push from the roller member 40. The releasing inclined surface 642 means another slope or slanted surface of the pushable component 64 that is inclined relative to the inclined abutting surface 641. The positioning structure 61' is connected to one end of the spanning portion 62, and the guiding rod 65 stands at the opposing end of the spanning portion 62. The positioning structure 61' may have a shape extending downward from a distal end of the spanning portion 62.

Figure 10:
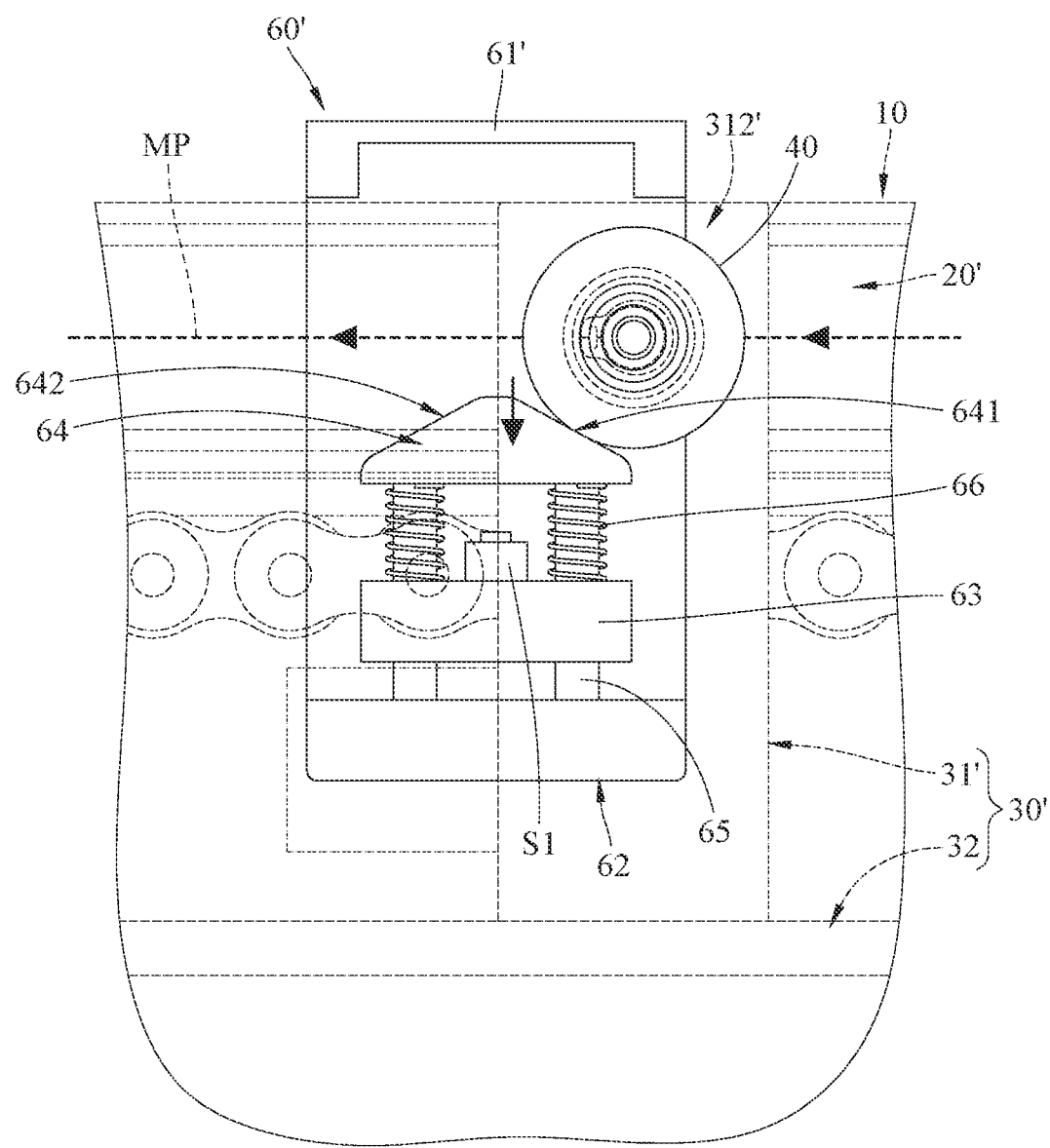
FIG. 10 is a partially-enlarged view of a vertical transmission equipment according to one embodiment of the disclosure when the carrier moves along the transmission path and just touches the positioning assembly.
Figure 11:
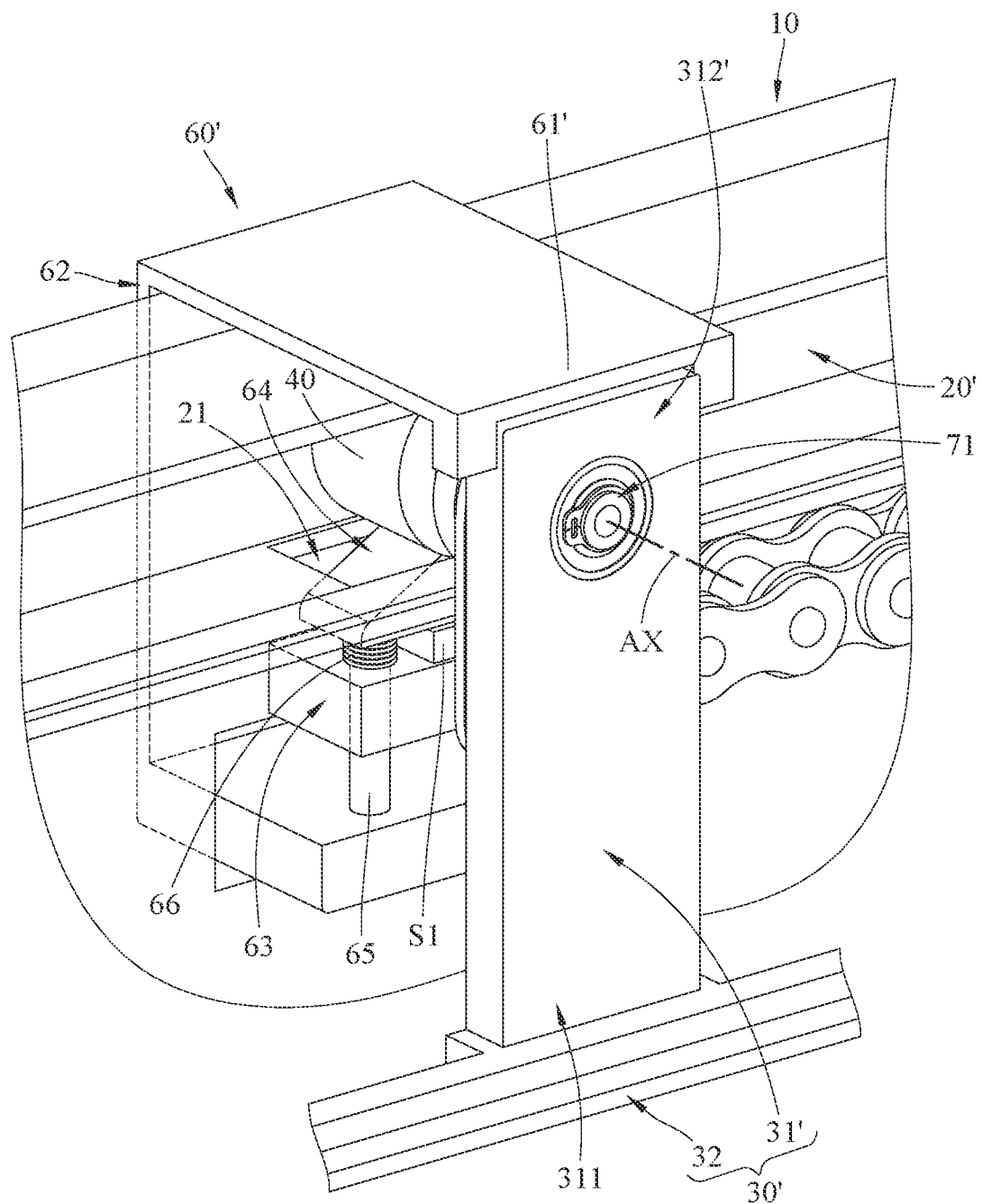
FIGS. 11-12 are partially-enlarged views of a vertical transmission equipment according to one embodiment of the disclosure, taken from different view angles, when the carrier is positioned by the positioning assembly.
Figure 12:
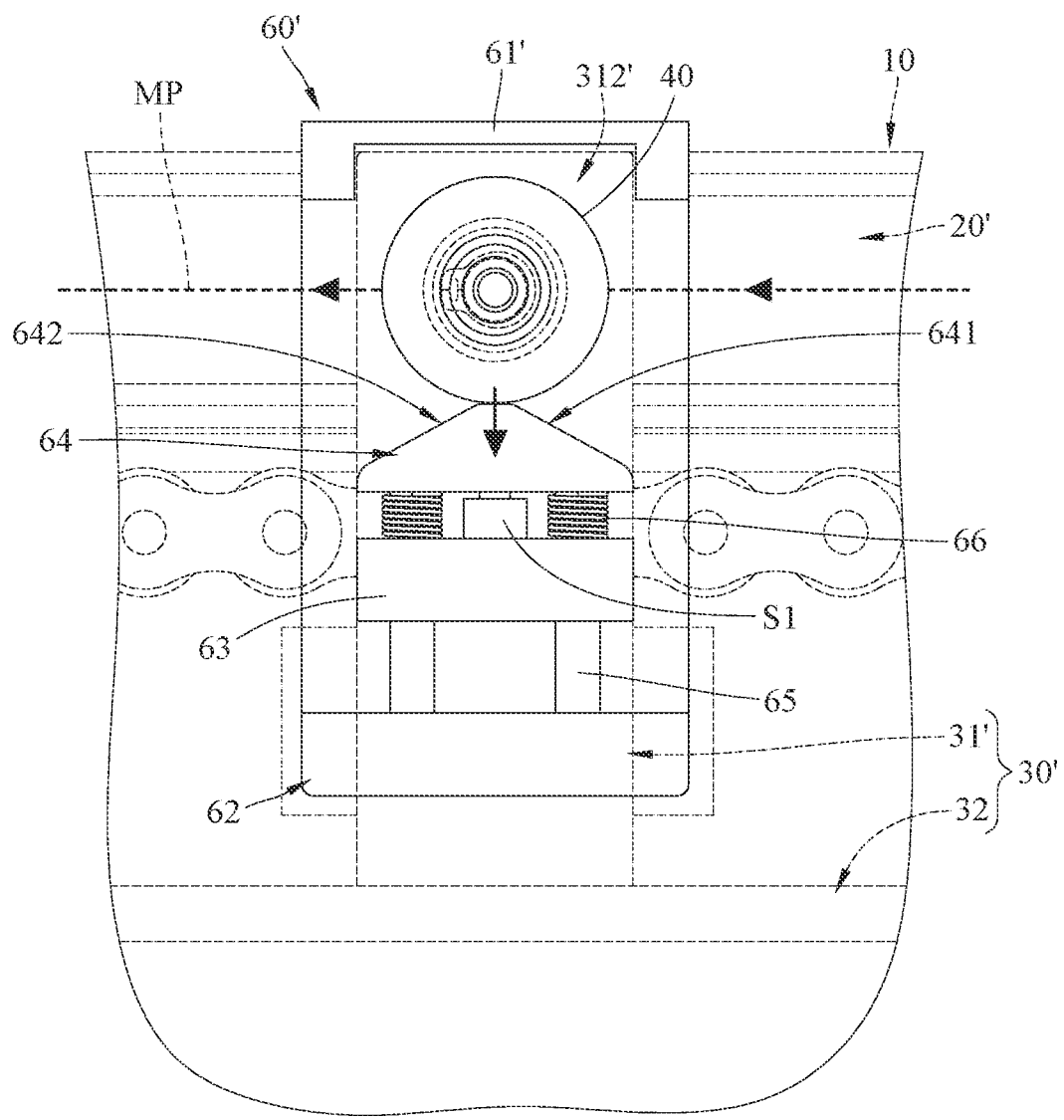

Then, please refer to FIGS. 9-10 and further refer to FIGS. 11-12. Firstly, FIGS. 9-10 show that the carrier 30' moves along the transmission path MP to a position of just contacting the inclined abutting surface 641 of the positioning assembly 60' which is kept in the rail structure 20' by the elastic component 66. The motion of the roller member 40 in the transmission path MP can apply force to push the inclined abutting surface 641 so as to force the pushable component 64 to move out of the rail structure 20'. In specific, the pushable component 64 is selectively removed out of the through hole 21 of the rail structure 20' by being pushed by the roller member 40.

During the movement of the roller member 40 that pushes the pushable component 64 out of the through hole 21 of the rail structure 20', the pushable component 64 moves the positioning structure 61' in the same direction through the guiding rod 65 and the spanning portion 62. Then, as shown in FIG. 11-12, a distal portion 312' of the bridging structure 31' of the carrier 30' and the positioning structure 61' are moved to engage with each other. As a result, the carrier 30' is captured by the positioning assembly 60' so that the angle and position of the carrier 30' are secured. Meanwhile, the movement of the pushable component 64 driven by the roller member 40 can activate the first sensor S1 so that the transmission component 50 is stopped moving the carrier 30' accordingly. It is noted that the first sensor S1 may correspond to the pushable component 64 and therefore the outer plate 51 of the transmission component 50 in this embodiment may omit the aforementioned protrusion structure 512.

After a predetermined period of time, the transmission component 50 may be activated again to move the carrier 30' and the roller member 40 along the transmission path MP, such that the roller member 40 can move onto the releasing inclined surface 642 of the pushable component 64. During such a movement of the roller member 40, the pushable component 64 gradually enters into the rail structure 20' by being forced by the elastic component 66, and the positioning structure 61' may be simultaneously moved in the same direction via the guiding rod 65 and the spanning portion 62, such that the positioning structure 61' releases the bridging structure 31' of the carrier 30', thereby allowing the roller member 40 and the carrier 30' to keep moving along the transmission path MP.

Figure 13:
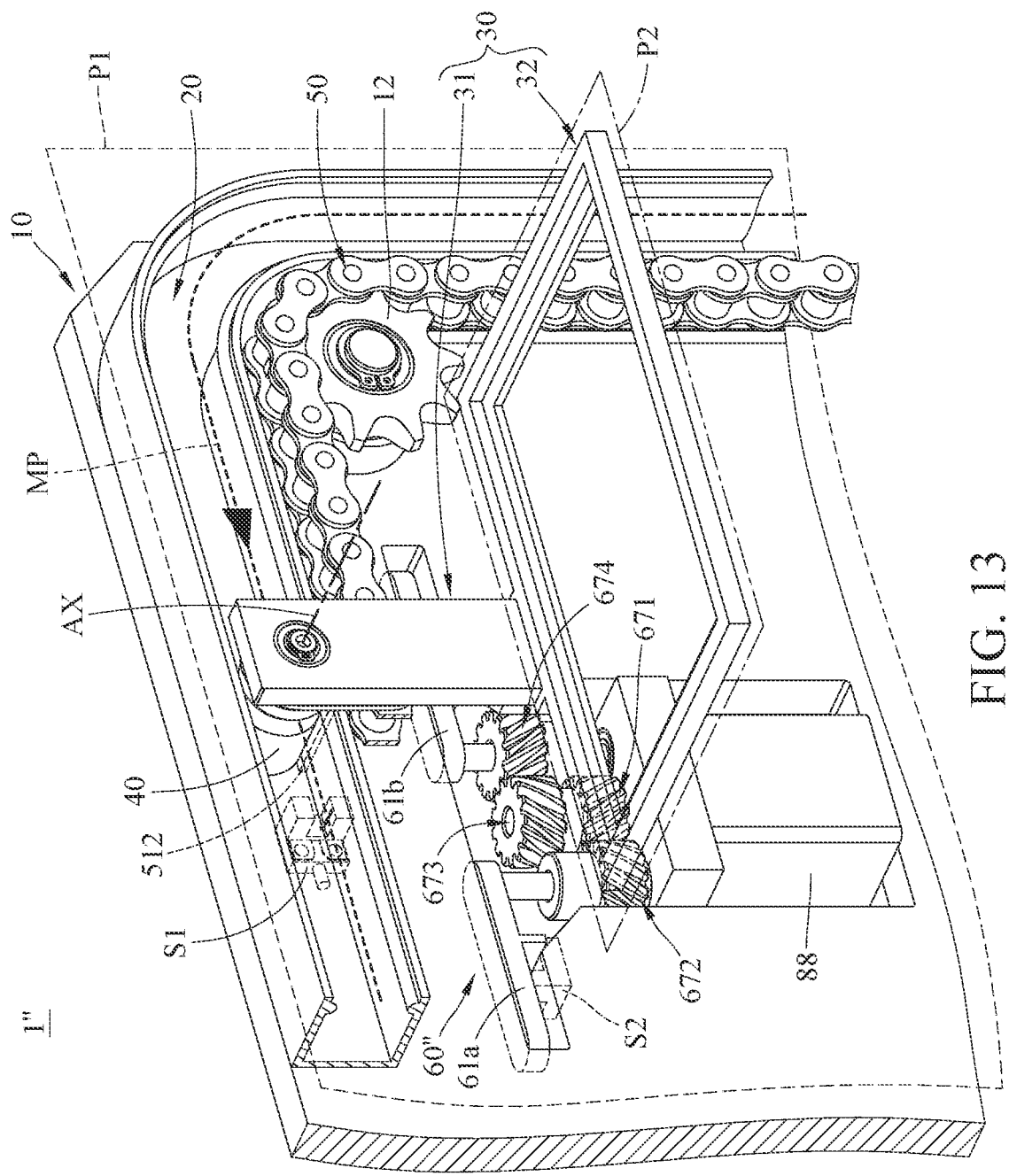
FIG. 13 is a partially-enlarged view of a vertical transmission equipment according to one embodiment of the disclosure.
Figure 14:
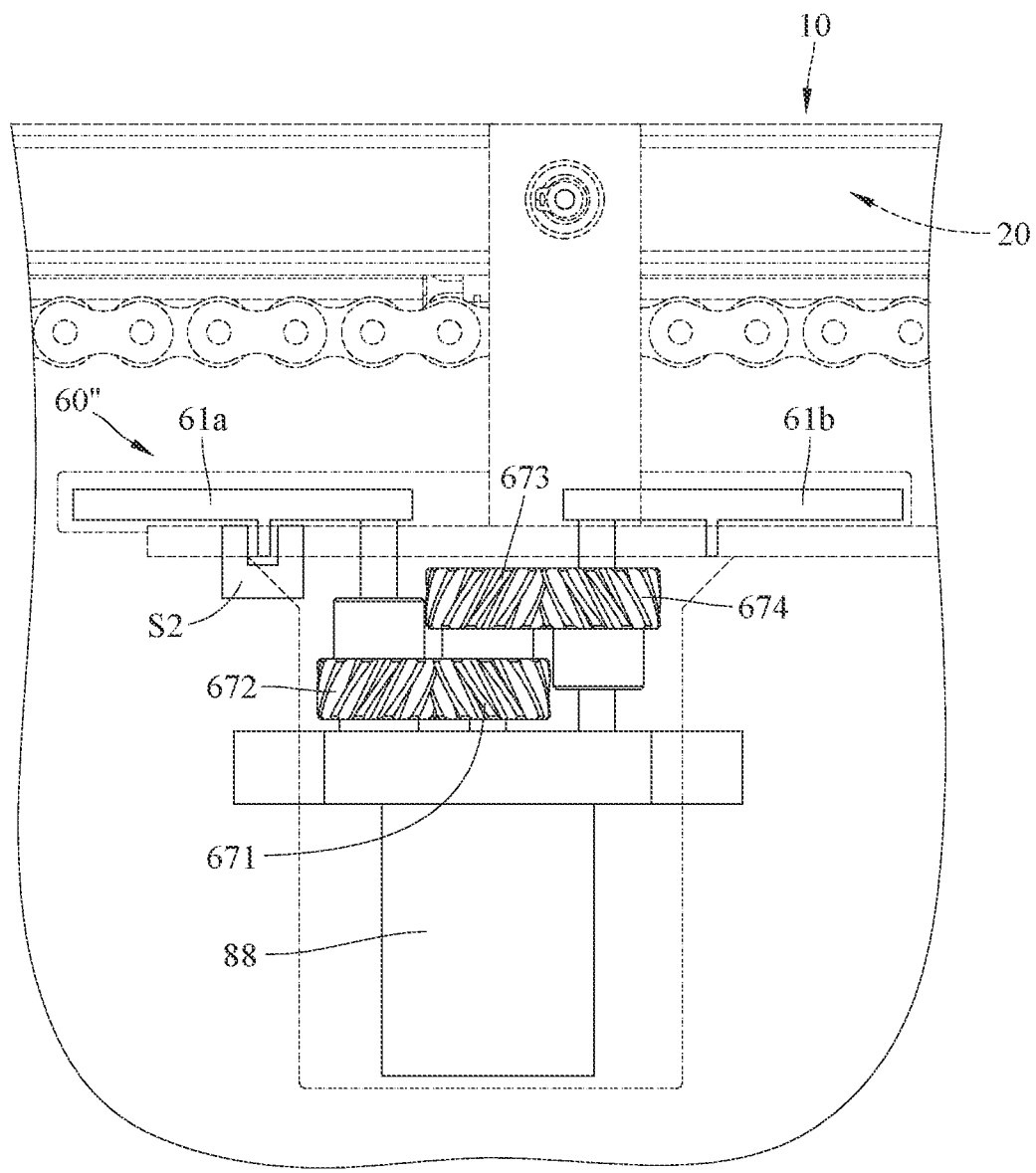
FIG. 14 is a top view of a positioning assembly according to one embodiment of the disclosure.
Figure 15:
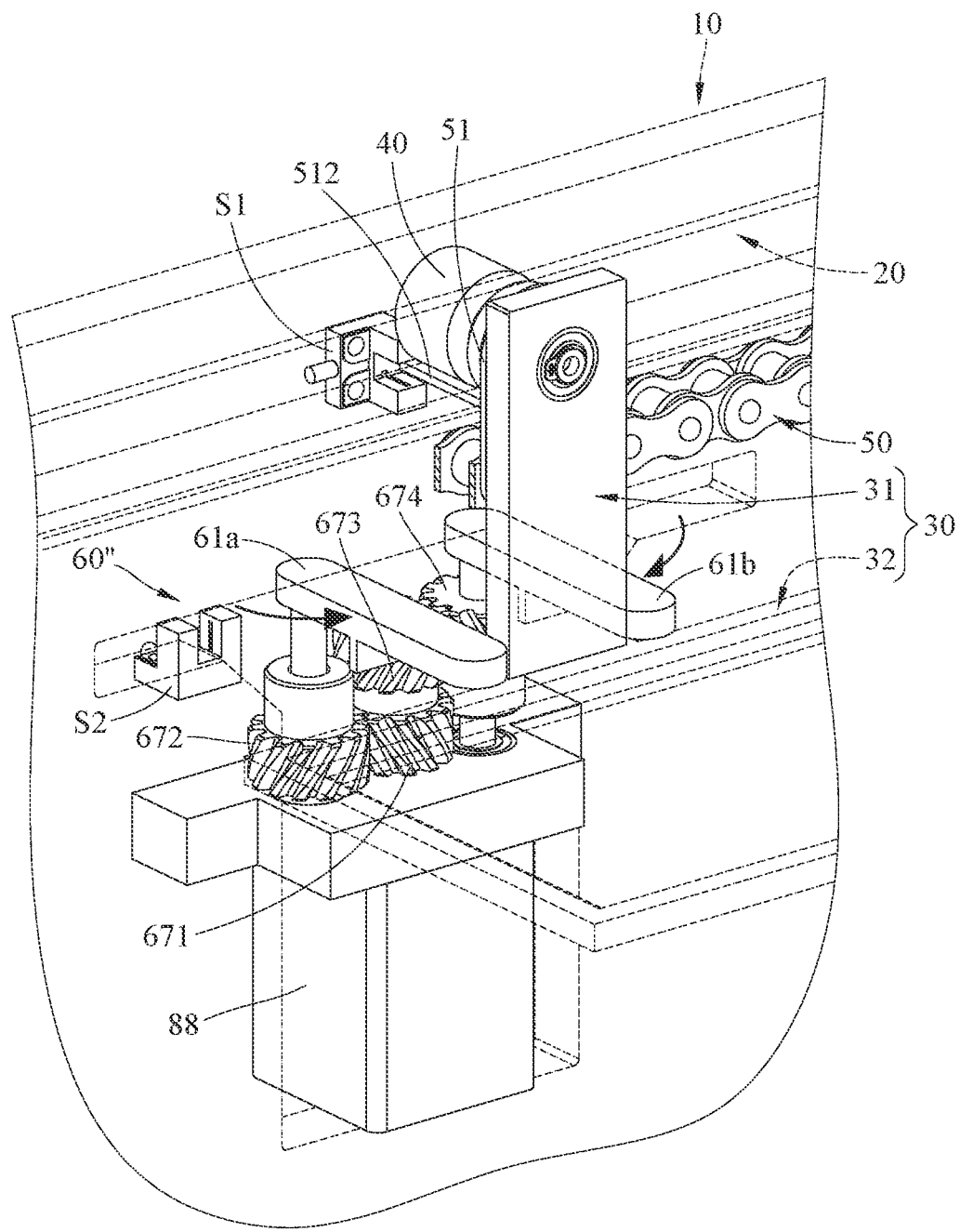
FIG. 15 depicts the operation of a positioning assembly according to one embodiment of the disclosure.

Please refer to FIGS. 13-15, another embodiment of the disclosure provides a vertical transmission equipment 1" whose positioning assembly 60" is the main difference from the previous embodiments. Specifically, the positioning assembly 60" may include a first positioning structure 61a, a second positioning structure 61b, a first driving gear 671, a first driven gear 672, a second driving gear 673, and a second driven gear 674, where the first driving gear 671, the first driven gear 672, the second driving gear 673, and the second driven gear 674 may be any suitable helical gear whose teeth are cut at an angle to the axis.

The first driving gear 671 may be connected to the power source 88 and is movably disposed on the base 10 via the power source 88. Specifically, the power source 88 is able to rotate the first driving gear 671 about a direction perpendicular to the axis AX, the first driven gear 672 is meshed with the first driving gear 671, the first positioning structure 61a is fixed to the first driven gear 672 and therefore is movably connected to the first driving gear 671 via the first driven gear 672.

The second driving gear 673 may be connected to the power source 88 and is movably disposed on the base 10 via the power source 88. Specifically, the second driving gear 673 and the first driving gear 671 may be coaxially disposed on the shaft of the power source 88, thus the power source 88 is able to rotate the second driving gear 673 about the direction perpendicular to the axis AX. As shown, the first driving gear 671 and the second driving gear 673 may have opposite helices. In this embodiment, the first driving gear 671 and the second driving gear 673 may be two independent gears, but the disclosure is not limited thereto; for example, in other embodiments, the first driving gear 671 and the second driving gear 673 may be integrally formed with each other. The second driven gear 674 is meshed with the second driving gear 673, the second positioning structure 61b is fixed to the second driven gear 674 and therefore is movably connected to the second driving gear 673 via the second driven gear 674.

As such, when the power source 88 rotates the first driving gear 671 and the second driving gear 673, the first driving gear 671 and the second driving gear 673 are able to rotate the first positioning structure 61a and the second positioning structure 61b in opposite directions by rotating the first driven gear 672 and the second driven gear 674.

For example, as shown in FIG. 15, when the first sensor S1 senses the protrusion structure 512 of the outer plate 51 (meaning that the carrier 30 reaches the predetermined position), the power source 88 can accordingly cause the first positioning structure 61a and the second positioning structure 61b to rotate in opposite directions (as indicated by the arrows) via the first driving gear 671 and the first driven gear 672 and the second driving gear 673 and the second driven gear 674, such that the first positioning structure 61a and the second positioning structure 61b will contact or appear at two opposite sides of the bridging structure 31 of the carrier 30. At that moment, the part of the carrier 30 which is located relatively away from the axis AX can be clamped or held by the first positioning structure 61a and the second positioning structure 61b (or, sandwiched between the first positioning structure 61a and the second positioning structure 61b), so that the angle and position of the carrier 30 are secured.

After a predetermined period of time, the power source 88 may reversely rotate the first driving gear 671 and the second driving gear 673 to move the first positioning structure 61a and the second positioning structure 61b away from the carrier 30. When the second sensor S2 senses one of the positioning structures (e.g., the first positioning structure 61a), it is determined that the first positioning structure 61a and the second positioning structure 61b are at a position that does not interfere with the movement of the carrier 30, thereby allowing the transmission component 50 to keep moving the roller member 40 and the carrier 30 along the transmission path MP.

It is noted that the vertical transmission equipments in some other embodiments may omit the aforementioned second positioning structure, second driving gear, and second driven gear and only remain the first driving gear, the first driven gear, and the first positioning structure to stop at one side of the carrier.

According to the vertical transmission equipments as discussed in the above embodiments of the disclosure, the supporting surface of the carrier is perpendicular to the mount surface of the base, the supporting surface does not overlap with the rail structure in the normal line of the supporting surface, or the supporting surface of the carrier is perpendicular to the imaginary plane which is defined by the transmission path of the carrier, thus, the supporting surface of the carrier is movably kept in an angle perpendicular to the base and the rail structure. In other words, the vertical transmission equipment achieves a well plate carrier capable of movable in vertical manner, which makes the vertical transmission equipment take lesser horizontal space and therefore is favorable for increasing the number of equipments in a laboratory constrained by limited space.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A vertical transmission equipment, comprising:
   a base having a mount surface;
   a rail structure disposed on the mount surface;
   a carrier movably disposed on the rail structure and comprising a supporting surface and a well plate being supported by the supporting surface;
   a transmission component movably disposed on the base and comprising a conveyor member and a protrusion structure;
   a positioning assembly disposed on the base, the positioning assembly comprising a positioning structure, the carrier having a positioning hole, and the positioning structure of the positioning assembly selectively inserted into the positioning hole; and
   a first sensor disposed on the base, wherein when the protrusion structure is sensed by the first sensor, the positioning structure is inserted into the positioning hole, and the carrier is positioned,
   wherein a projection of the rail structure on the mount surface does not overlap with a projection of the conveyor member on the mount surface, and the supporting surface of the carrier is perpendicular to the mount surface of the base.

2. The vertical transmission equipment according to claim 1, further comprising a roller member, wherein the roller member is movably disposed on the rail structure, the carrier comprises a bridging structure and a supporting structure, the bridging structure is pivotally connected to the roller member and is connected to the supporting structure, and the supporting surface is located on the supporting structure.

3. The vertical transmission equipment according to claim 2, wherein the bridging structure of the carrier has the positioning hole.

4. The vertical transmission equipment according to claim 3, wherein the transmission component further comprises a plate portion fixed to the conveyor member, the protrusion structure protrudes from the plate portion, and a part of the plate portion is pivotally connected between the roller member and the bridging structure of the carrier.

5. The vertical transmission equipment according to claim 2, wherein the bridging structure of the carrier is pivotally connected to the roller member about an axis, and the positioning hole and the axis are respectively located adjacent to two opposite ends of the bridging structure.

6. The vertical transmission equipment according to claim 1, wherein the positioning assembly further comprises a second sensor disposed on the base, the second sensor is configured to determine whether the positioning structure is moved out of the positioning hole by sensing the positioning structure.

7. A vertical transmission equipment, comprising:
   a base;
   a rail structure disposed on the base;
   a carrier movably disposed on the rail structure and comprising a supporting surface, and a well plate being supported by the supporting surface;
   a transmission component movably disposed on the base and comprising a conveyor member and a protrusion structure;
   a positioning assembly disposed on the base, the positioning assembly comprising a positioning structure, the carrier having a positioning hole, and the positioning structure of the positioning assembly selectively inserted into the positioning hole; and
   a first sensor disposed on the base, wherein when the protrusion structure is sensed by the first sensor, the positioning structure is inserted into the positioning hole, and the carrier is positioned,
   wherein the rail structure surrounds the conveyor member within, and the supporting surface of the carrier and the rail structure are located without overlapping in a normal direction of the supporting surface.

8. The vertical transmission equipment according to claim 7, further comprising a roller member, wherein the roller member is movably disposed on the rail structure, the carrier comprises a bridging structure and a supporting structure, the bridging structure is pivotally connected to the roller member and is connected to the supporting structure, and the supporting surface is located on the supporting structure.

9. The vertical transmission equipment according to claim 8, wherein the bridging structure of the carrier has the positioning hole.

10. The vertical transmission equipment according to claim 9, wherein the transmission component further comprises a plate portion fixed to the conveyor member, the protrusion structure protrudes from the plate portion, and a part of the plate portion is pivotally connected between the roller member and the bridging structure of the carrier.

11. The vertical transmission equipment according to claim 8, wherein the bridging structure of the carrier is pivotally connected to the roller member about an axis, and the positioning hole and the axis are respectively located adjacent to two opposite ends of the bridging structure.

12. The vertical transmission equipment according to claim 7, wherein the positioning assembly further comprises a second sensor disposed on the base, the second sensor is configured to determine whether the positioning structure is moved out of the positioning hole by sensing the positioning structure.

13. A vertical transmission equipment, comprising:
a base;
a carrier comprising a supporting surface and movably disposed on the base along a transmission path;
a transmission component movably disposed on the base and comprising a conveyor member and a protrusion structure;
a positioning assembly disposed on the base, the positioning assembly comprising a positioning structure, the carrier having a positioning hole, and the positioning structure of the positioning assembly selectively inserted into the positioning hole to position the carrier; and
a first sensor disposed on the base, wherein when the protrusion structure is sensed by the first sensor, the positioning structure is inserted into the positioning hole, and the carrier is positioned,
wherein the supporting surface of the carrier is perpendicular to an imaginary plane which is defined by the transmission path of the carrier, and a projection of the transmission path on the imaginary plane does not overlap with a projection of the conveyor member on the imaginary plane.

14. The vertical transmission equipment according to claim 13, wherein the carrier further comprises a bridging structure, and the bridging structure of the carrier has the positioning hole.

15. The vertical transmission equipment according to claim 13, further comprising a rail structure, and a roller member, wherein the base has a mount surface, the rail structure is disposed on the base, the roller member is movably disposed on the rail structure, the carrier further comprises a bridging structure and a supporting structure, the bridging structure is pivotally connected to the roller member and is connected to the supporting structure, and the supporting surface is located on the supporting structure.

16. The vertical transmission equipment according to claim 13, wherein the positioning assembly further comprises a second sensor disposed on the base, the second sensor is configured to determine whether the positioning structure is moved out of the positioning hole by sensing the positioning structure.

* * * * *